(12) United States Patent
Jones et al.

(10) Patent No.: US 11,381,523 B2
(45) Date of Patent: Jul. 5, 2022

(54) AUTOMATED INSTALLATION LOCATION DETECTION FOR ETHERNET-BASED DEVICES

(71) Applicant: BAE Systems Information and Electronic Systems Integration Inc., Nashua, NH (US)

(72) Inventors: Christopher L. Jones, Georgetown, TX (US); Paul W. Davis, Austin, TX (US); Dylan George, Austin, TX (US); Jonathon E. Kruger, Pflugerville, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 9 days.

(21) Appl. No.: 16/849,446

(22) Filed: Apr. 15, 2020

(65) Prior Publication Data
US 2021/0328943 A1 Oct. 21, 2021

(51) Int. Cl.
*H04L 49/351* (2022.01)
*G06F 9/4401* (2018.01)
*H04L 45/745* (2022.01)
*H04L 61/25* (2022.01)
*H04L 101/622* (2022.01)

(52) U.S. Cl.
CPC .......... *H04L 49/351* (2013.01); *G06F 9/4401* (2013.01); *H04L 45/745* (2013.01); *H04L 61/25* (2013.01); *H04L 2101/622* (2022.05)

(58) Field of Classification Search
CPC . H04L 49/351; H04L 61/6022; H04L 45/745; H04L 61/25; G06F 9/4401
See application file for complete search history.

(56) References Cited

U.S. PATENT DOCUMENTS

| | | | |
|---|---|---|---|
| 6,982,953 B1 | 1/2006 | Swales | |
| 9,756,682 B2 | 9/2017 | Iyer et al. | |
| 9,935,821 B2 | 4/2018 | Huth et al. | |
| 10,389,736 B2* | 8/2019 | Dawes | ................ H04L 63/0227 |
| 11,153,155 B1* | 10/2021 | Perez | .................. H04L 41/0886 |
| 2014/0244822 A1* | 8/2014 | Ban | ......................... H04L 41/00 709/223 |

(Continued)

*Primary Examiner* — Jamal Javaid
*Assistant Examiner* — Shawn D Miller
(74) *Attorney, Agent, or Firm* — Finch & Maloney PLLC; Gary McFaline

(57) ABSTRACT

Methods and structures are disclosed for self-automating a process of determining a device's location based on its network address. A computing device includes a network interface configured to communicate with a physical port of a network switch and a memory configured to store a plurality of different initialization protocols each associated with a corresponding network address of a plurality of network addresses. Each of the initialization protocols may be associated with a different physical location. The computing device also includes a processor configured to attempt to connect to the network switch via the network interface using a network address from the stored plurality of network addresses. In response to connecting with the network switch using the network address, the processor identifies a corresponding initialization protocol associated with the network address and executes the corresponding initialized procedure.

20 Claims, 8 Drawing Sheets

(56) References Cited

U.S. PATENT DOCUMENTS

| | | | |
|---|---|---|---|
| 2014/0281614 A1* | 9/2014 | Mick | G06F 1/3206 |
| | | | 713/322 |
| 2016/0321200 A1* | 11/2016 | Long | G06F 13/4282 |
| 2017/0220333 A1* | 8/2017 | Higginson | H04L 12/10 |
| 2019/0187999 A1* | 6/2019 | Lu | H04L 45/00 |
| 2020/0213263 A1* | 7/2020 | Allinson | H04L 61/609 |
| 2020/0213273 A1* | 7/2020 | Periyaeluvan | H04L 61/2567 |
| 2020/0250053 A1* | 8/2020 | Bhatia | G06F 11/1612 |

* cited by examiner

| 00:0a:95:9d:68:01 | 1st Initialization Protocol |
| --- | --- |
| 00:0a:95:9d:68:02 | 2nd Initialization Protocol |
| 00:0a:95:9d:68:03 | 3rd Initialization Protocol |
| 00:0a:95:9d:68:04 | 4th Initialization Protocol |
| 00:0a:95:9d:68:05 | 5th Initialization Protocol |
| 00:0a:95:9d:68:06 | 6th Initialization Protocol |

FIG. 3A

AUTOMATED INSTALLATION LOCATION DETECTION FOR ETHERNET-BASED DEVICES

GOVERNMENT LICENSE RIGHTS

This invention was made with government support under contract #W56HZV-19-C-0035 awarded by the U.S. Army. The government has certain rights in the invention.

BACKGROUND

A network may include multiple devices that are identical from a hardware and installed software standpoint and that are placed at different physical locations to perform different tasks. Upon powering up, each of the devices needs to identify where it is physically located to configure itself for that particular location. Each of the devices may be manually configured for each corresponding location, but this process is time consuming and prone to human error. As will be appreciated, a number of non-trivial issues remain with respect to automating a process for such devices to self-identify their locations.

BRIEF DESCRIPTION OF THE DRAWINGS

FIGS. 3A, 3B, and 3C provide example look-up tables for determining which initialization protocol to use, in accordance with an embodiment of the present disclosure.

Figure 1:
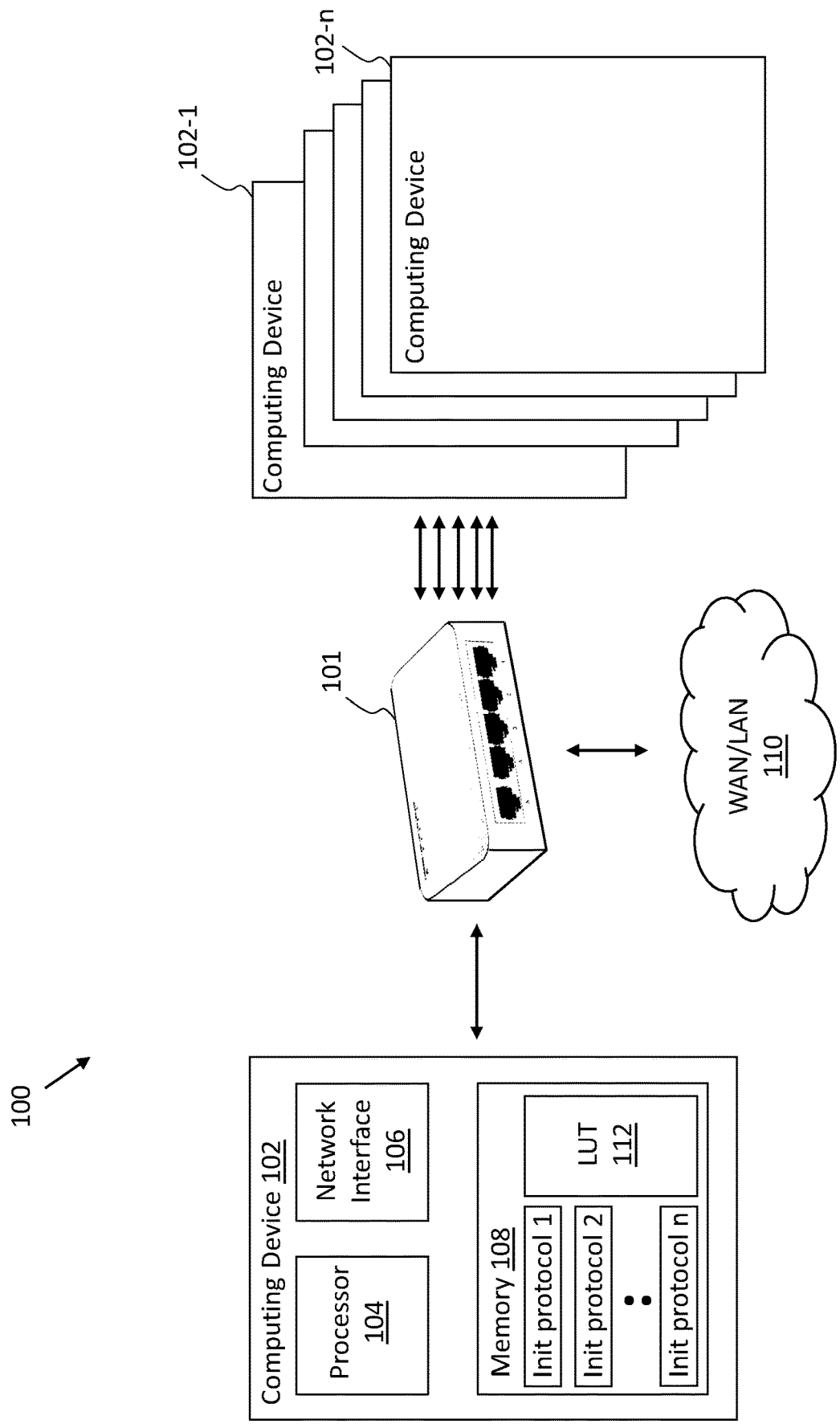
FIG. 1 is a schematic diagram of an Ethernet network, in accordance with an embodiment of the present disclosure.

These and other features of the present embodiments will be understood better by reading the following detailed description, taken together with the figures herein described.

DETAILED DESCRIPTION

Methods and structures are disclosed for self-automating a process of determining a device's location based on its network address. The devices may have identical hardware configurations, and installed software that needs to be configured differently depending on the location of the device. One example includes devices located around different areas of a vehicle. The devices may be connected to a network, such as a wired Ethernet network, and can each leverage their network address back to the Ethernet hub or network switch to self-determine their location. In an embodiment, a computing device includes a network interface configured to communicate with a physical port of a network switch and a memory configured to store a plurality of different initialization protocols each associated with a corresponding network address of a plurality of network addresses. Each of the initialization protocols may be associated with one or more different physical locations. For example, a device located on the undercarriage of a vehicle would be initialized differently from a device located within the dashboard of the vehicle. The computing device also includes a processor configured to attempt to connect to the network switch via the network interface using a network address from the stored plurality of network addresses. The network addresses may be, for instance, media access control (MAC) addresses, or any other unique physical hardware address. In response to connecting with the network switch using the network address, the processor identifies a corresponding initialization protocol associated with the network address and executes the corresponding initialized procedure. Numerous embodiments and variations will be appreciated in light of this disclosure.

General Overview

As previously noted, there a number of non-trivial issues that remain with respect to identifying locations for certain devices that share similar or the same hardware configurations. Using devices having the same hardware drastically reduces costs and allows for the devices to be used in different locations. When placed in a particular location, the device need only to identify its location so that the correct firmware or software can be initialized (e.g., during a boot process) for that location. This location identification process can be performed manually for each device by changing pin arrangements or switch settings on the physical device. Such methods are cumbersome and time-consuming and must be manually reconfigured each time the device is moved to a new location.

Thus, and in accordance with an embodiment of the present disclosure, techniques are disclosed for initializing a computing device based on its physical location. The initialization process determines the network address that the computing device uses to successfully connect with an Ethernet network switch and compares the network address to a corresponding location using, for example, a look-up table that is indexed by network addresses, or any comparable construct. For example, a series of network addresses (e.g., MAC addresses) may each be associated with a different location, and a computing device may go through the list trying to connect to the network using different addresses until one of them works. The working network address may then be used to index into or otherwise identify a corresponding entry stored in the look-up table to determine the computing device's location. According to an embodiment, the network includes an Ethernet switch that assigns only one unique address for each of its physical ports, such that a computing device connected to one of the ports of the network switch can only connect to the network when using the correct address for that port. As used herein, the term "physical port" refers to a port that communicates via only a wired connection. Although Ethernet networks are used herein as an example, other network wired network topologies may be used as well.

In more detail, and in accordance with an embodiment, a computing device includes a network interface, a memory, and a processor. The network interface communicates with a physical port of a network switch. The memory stores a plurality of different initialization protocols each associated with a corresponding network address of a plurality of network addresses. The processor is configured to attempt to connect to the network switch via the network interface using a network address from the stored plurality of network addresses. In response to connecting with the network switch using the network address, the processor identifies a corresponding initialization protocol associated with the network address and executes the corresponding initialization protocol. The network may be an Ethernet network with each of the computing devices connected via an Ethernet cable to a common Ethernet switch.

According to another example embodiment, an Ethernet network includes an Ethernet switch and a plurality of computing devices. The Ethernet switch includes a plurality of physical ports and is configured such that each port of the plurality of physical ports is associated with a single unique address. Each computing device of the plurality of computing devices includes a network interface, a memory, and a processor. The network interface communicates with one port of the plurality of physical ports. The memory stores a plurality of different initialization protocols each associated with a corresponding network address of a plurality of network addresses. The processor is configured to attempt to connect to the Ethernet switch via the network interface using a network address from the stored plurality of network addresses. In response to connecting with the Ethernet switch using the network address, the processor identifies a corresponding initialization protocol associated with the network address and executes the corresponding initialization protocol. In some examples, the Ethernet switch is a layer 2 (L2) network switch.

According to another example embodiment, a computer program product includes one or more non-transitory machine-readable mediums encoding instructions that when executed by one or more processors cause a process to be carried out for initializing a computing device based on its physical location. The process includes attempting to connect to a network switch via a network interface of the computing device using a network address from a stored plurality of network addresses, wherein each of the stored plurality of network addresses is associated with a different initialization protocol; in response to connecting with the network switch using the network address, identifying a corresponding initialization protocol associated with the network address; and executing the corresponding initialization protocol.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

FIG. 1 illustrates an example network environment 100 that may be present in any number of different settings. For example, network environment 100 may be used with computing devices located around a vehicle, such as a land, air, or aquatic vehicle. In some other examples, network environment 100 is used with computing devices located in different rooms of a building. Network environment 100 includes a network switch 101 and at least one computing device 102. In some embodiments, network environment 100 includes a plurality of n computing devices 102-1 to 102-$n$ connected to switch 101. Each of plurality of n computing devices 102-1 to 102-$n$ may have the same hardware and loaded software as computing device 102. In some examples, computing devices 102-1 to 102-$n$ represent Ethernet-capable devices that connect to switch 101 via Ethernet cables.

Switch 101 may be an Ethernet switch or hub, according to some embodiments. In one example, switch 101 is a layer 2 (L2) Ethernet switch or a layer 3 (L3) Ethernet switch. Other types of switch networks such as Fibre Channel, RapidIO, asynchronous transfer mode (ATM), ITU-T, G.hn, and IEEE 802.11 may be used as well. Switch 101 includes a plurality of physical ports for connecting, via a wired connection, to other computing devices. According to an embodiment, each port connects to a single computing device to transfer data to and from that computing device. In some examples, the data transfer may be between computing devices connected to different ports of switch 101. In some examples the data transfer is between any of the connected computing devices and a Wide Area Network (WAN) or Local Area Network (LAN) 110. Data may be uploaded to or downloaded from WAN/LAN 110 via another wired connection to a port of switch 101 or via wireless transmission of the data to a receiver within switch 101. In some embodiments, WAN/LAN 110 may be further connected to the Internet.

Some switches dynamically allocate network addresses to the various ports, such that a port may not always have the same network address associated with it. However, according to an embodiment, switch 101 is a managed switch that is configured to allocate a unique network address that can access one or more of its ports, such that the network addresses associated with those ports remain consistent. For example, switch 101 may be configured to employ MAC address filtering to allow only one MAC address per port, with each port having a unique MAC address that it is allowed to communicate with. Switch 101 may be managed using a command-line interface (CLI) accessed via a serial console, telnet or Secure Shell, an embedded Simple Network Management Protocol (SNMP) agent allowing management from a remote console or management station, or a web interface for management from a web browser, to name a few examples. Accordingly, a computing device connected to one of these ports can only connect to switch 101 if it uses the corresponding network address associated with the connected port.

Computing device 102 may represent any or each of computing devices 102-1-102-$n$. That is, according to some embodiments, each of the computing devices has the same hardware and loaded software. The same loaded software allows each computing device 102 to be initialized for different tasks, depending on the location of the computing device. In some embodiments, each computing device 102 includes at least a processor 104, a network interface 106, and a memory 108.

As used herein, the term "processor" may refer to any device or portion of a device that processes electronic data from registers and/or memory to transform that electronic data into other electronic data that may be stored in registers and/or memory. Processor 104 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. In some embodiments, processor 104 is designed to execute instructions that determine a location of computing device 102 based on a network address used to connect with switch 101.

Network interface 106 can be any appropriate network chip or chipset which allows for wired and/or wireless connection between other computing devices **102-1-102-*n* and/or switch 101, thereby enabling computing device 102 to communicate with other local and/or remote computing devices, servers, cloud-based servers, and/or other resources. According to an embodiment, network interface 106 communicates at least with switch 101 via a wired communication that conforms to existing (or yet to be developed) standards, such as, for example, Ethernet. Network interface 106** may also generally use wireless communication that conforms to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

Memory 108 can be implemented using any suitable type of digital storage including, for example, flash memory and/or random access memory (RAM). In some embodiments, memory 108 may include various layers of memory hierarchy and/or memory caches as are known to those of skill in the art. Memory 108 may be implemented as a volatile memory device such as, but not limited to, a RAM, dynamic RAM (DRAM), or static RAM (SRAM) device, or as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. Memory 108 can represent any number of memory devices.

According to an embodiment, memory 108 stores a plurality of n initialization protocols. Each initialization protocol may include instructions for configuring computing device 102 to operate a certain way based on its location. For example, a computing device located near an engine block of a vehicle may be initialized to sense parameters of the engine operation, while another computing device having the same hardware but located on top of the vehicle may be initialized to capture photos of the surrounding area and receive RF signals. In some embodiments, each initialization protocol includes instructions that affect the boot process of computing device 102 that changes the driver configurations for interfacing with various hardware components of computing device 102.

As can further be seen in the example embodiment of FIG. 1, memory 108 also stores a look-up table (LUT) 112 that associates different network addresses with either a particular location of computing device 102 and/or with one of the initialization protocols. As will be appreciated in light of this disclosure, the association between the network address and locations or initialization protocols can be made using any number of constructs and need not necessarily be organized as a look-up table. For example, different MAC addresses (MAC1, MAC2, MAC3, etc.) may each be associated with a particular location that computing device 102 could be in, where each location requires a different operation for computing device 102 (e.g., MAC1—>Location 1, MAC2—>Location 2, MAC3—>Location 3, etc.) Each location would then be associated with one of the initialization protocols, such that once the location is known by computing device 102, it can choose the initialization protocol associated with that location. In some embodiments, different MAC addresses may be associated with the same location in LUT 112. In another example, different MAC addresses (MAC1, MAC2, MAC3, etc.) may each be associated with a particular initialization protocol for configuring computing device 102 to operate differently (e.g., MAC1—>Init protocol 1, MAC2—>Init protocol 2, MAC3—>Init protocol 3, etc.). Note that the initialization protocols in memory 108 can be changed, modified, or otherwise updated as needed, to suit the particulars of a given configuration. According to an embodiment, the different MAC addresses and/or initialization protocols are stored in memory 108 a priori, or before computing device 102 establishes any connection with switch 101. In some embodiments, LUT 112 is stored in memory 108 a priori, or before computing device 102 establishes any connection with switch 101.

In order to determine the network address for computing device 102 (and, correspondingly, its location), processor 104 is designed to execute software that attempts to connect to switch 101 using one of a stored plurality of network addresses in memory 108 (e.g., one of the network addresses that is part of LUT 112). If the connection is successfully established, then LUT 112 is consulted to review the location and/or initialization protocol that is associated with that network address. If the connection is not successfully established, then processor 104 proceeds with attempting to connect to switch 101 using another one of the stored plurality of network addresses, until one of the network addresses is found to be successful. According to an embodiment, the connection with switch 101 is established via network interface 106 using a wired connection to one of the physical ports of switch 101.

Recall that each physical port of switch 101 is assigned a single consistent network address such that only one network address can be used to successfully connect to switch 101 via that port. Accordingly, in some embodiments, each computing device **102-1-102-*n* connects to switch 101 using a different network address corresponding to the fact that each computing device 102-1-102-*n* is at a different location. In some embodiments, more than one computing device is used at the same location and thus is configured using the same initialization protocol. In such an example, each of the computing devices at the same location may be connected to a set of ports on switch 101 that are assigned network addresses that each correspond to that location in LUT 112**.

In some embodiments, one or more of computing devices **102-1-102-*n* executes one of its initialization protocols upon starting up (e.g., during or before the boot process). In some embodiments, one or more of computing devices 102-1-102-*n*** executes one of its initialization protocols whenever prompted to either by a user or via some automated means.

Figure 2:
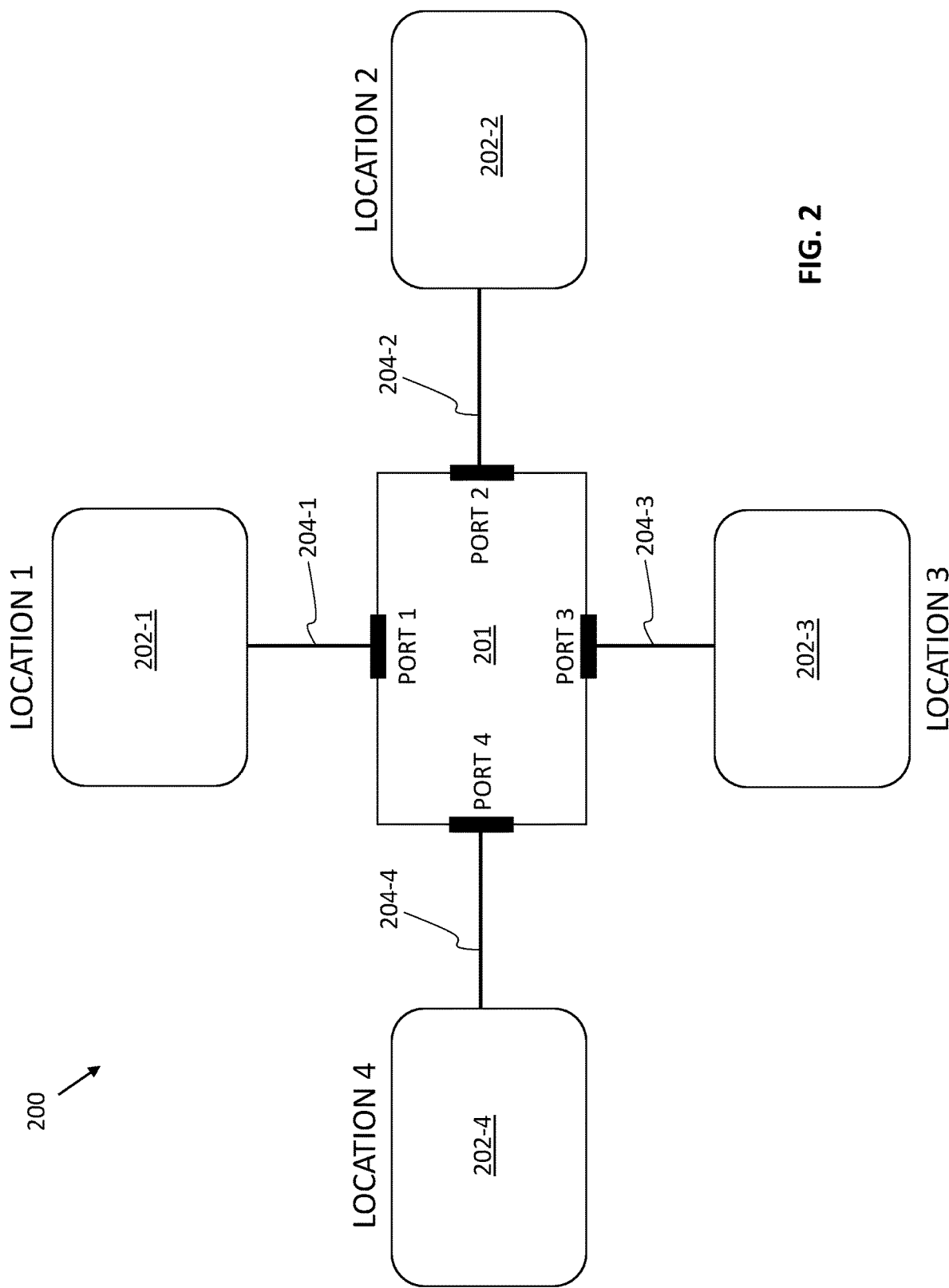
FIG. 2 is a schematic diagram of an Ethernet network illustrating different locations and port connections, in accordance with some embodiments of the present disclosure.

FIG. 2 illustrates an example of a network 200 having four computing devices 202-1-202-4 at four different locations and connected to a same switch 201, according to an embodiment. Switch 201 may have the same features and configuration as switch 101. According to some embodiments, each computing device 202 connects to a different port of switch 201 using a network cable 204. For example, computing device 202-1 is placed at location 1 and connects to port 1 of switch 201 using network cable 204-1, computing device 202-2 is placed at location 2 and connects to port 2 of switch 201 using network cable 204-2, computing device 202-3 is placed at location 3 and connects to port 3 of switch 201 using network cable 204-3, and computing device 202-4 is placed at location 4 and connects to port 4 of switch 201 using network cable 204-4. Each of the network cables 204 may be Ethernet cables. Each location may represent different regions of a vehicle or different rooms of a building, to name a few examples.

Each of the ports of switch 201 has a known association with a particular location, according to an embodiment. For example, Port 1 is configured to accept a network address that is associated with Location 1, port 2 is configured to accept a network address that is associated with Location 2, port 3 is configured to accept a network address that is associated with Location 3, and port 4 is configured to accept a network address that is associated with Location 4. Accordingly, whichever computing device is connected to port 1 will determine itself to be at location 1, whichever computing device is connected to port 2 will determine itself to be at location 2, and so forth. Any number of computing devices and switch ports may be part of network 200. Additionally, in some embodiments, there may be more ports than there are computing devices meaning that some of the switch ports are unused.

FIG. 3A illustrates an example LUT 300, according to an embodiment. LUT 300 may include an address list 302 that corresponds to a protocol list 304. In some embodiments, each element of address list 302 is associated with one element of protocol list 304. In some embodiments, one or more elements of protocol list 304 is each associated with more than one element of address list 302. In other words, some protocols are not unique to only a single device location but may be used at different possible device locations. It should be noted that the listed MAC addresses within address list 302 are provided as examples only.

Once a computing device has determined which network address provides a connection to the network switch, LUT 300 may be consulted to find the initialization protocol that is associated with that network address, according to an embodiment. In the illustrated example, if the computing device connects to its switch port by using MAC address 00:0a:95:9d:68:04, then LUT 300 can be accessed to determine that the fourth initialization protocol should be executed to configure the computing device for its location. When the computing device was placed at its location, it would have been connected to the port on the network switch that corresponds to its location (and the network switch allows access to the computing device having MAC address 00:0a:95:9d:68:04 via the connected port).

Figure 3B:
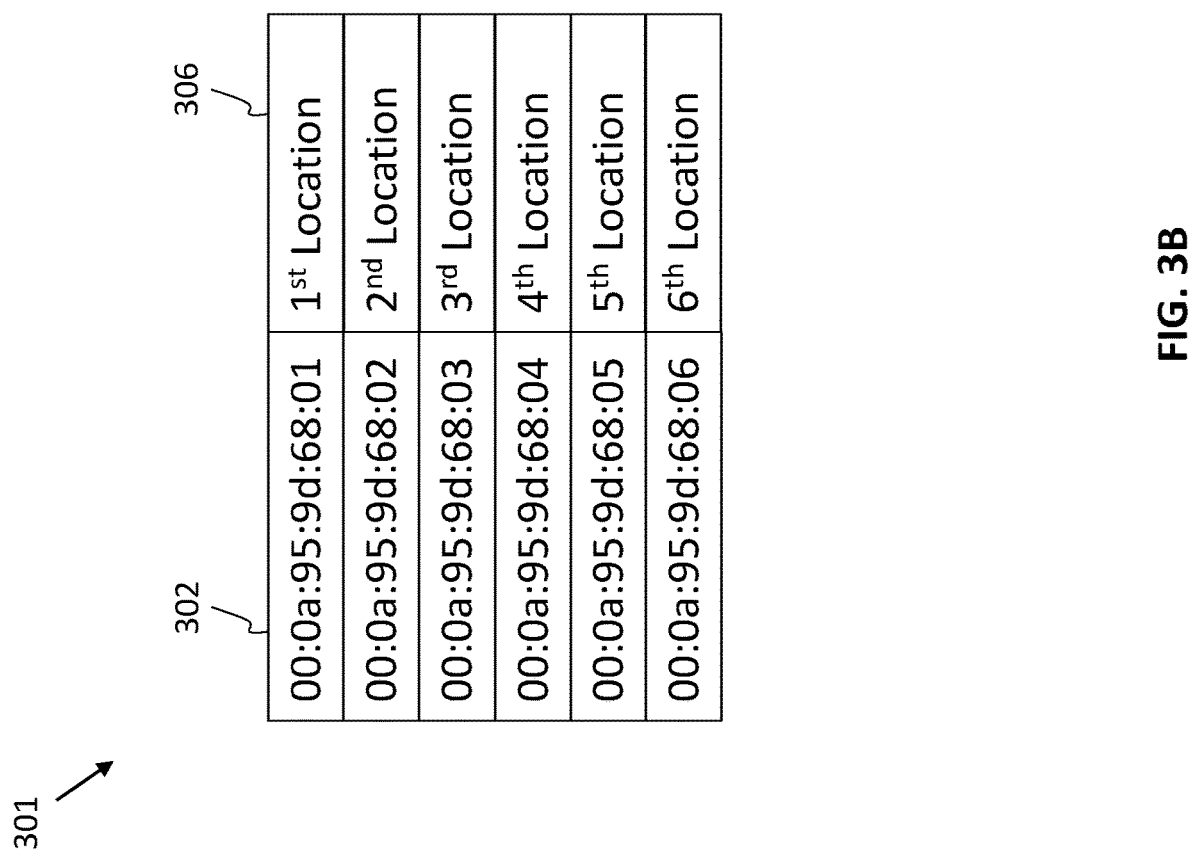

FIG. 3B illustrates another example LUT 301, according to an embodiment. LUT 301 may include address list 302 that corresponds to a location list 306. In some embodiments, each element of address list 302 is associated with one element of location list 306. In some embodiments, one or more elements of location list 306 is each associated with more than one element of address list 302. In other words, some subset of network addresses may each be associated with the same location. It should be noted that the listed MAC addresses within address list 302 are provided as examples only. In this example, each of the locations may be different areas around a vehicle or building.

Once a computing device has determined which network address provides a connection to the network switch, LUT 301 may be consulted to find the device location associated with that network address, according to an embodiment. In the illustrated example, if the computing device connects to its switch port by using MAC address 00:0a:95:9d:68:05, then LUT 301 can be accessed to determine that the device is located at the fifth location. When the computing device was placed at its location, it would have been connected to the port on the network switch that corresponds to its location (and the network switch allows access to the computing device having MAC address 00:0a:95:9d:68:05 via the connected port). Once the location is known, the computing device may then execute the initialization protocol stored in memory to configure it for use at that particular location.

Figure 3C:
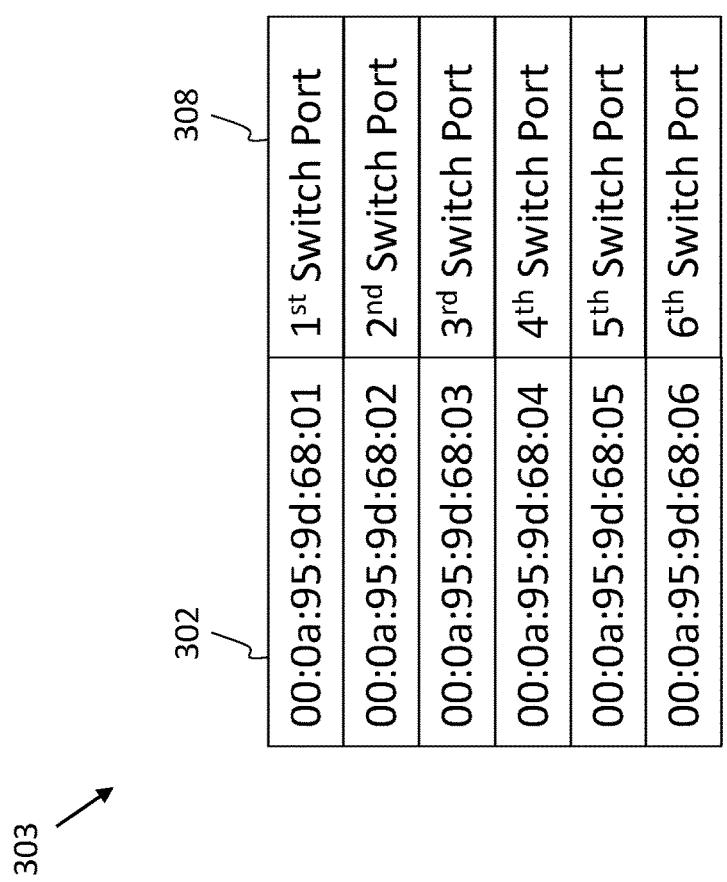

FIG. 3C illustrates another example LUT 303, according to an embodiment. LUT 303 may include address list 302 that corresponds to a port list 308. In some embodiments, each element of address list 302 is associated with one element of port list 308. It should be noted that the listed MAC addresses within address list 302 are provided as examples only.

Once a computing device has determined which network address provides a connection to the network switch, LUT 303 may be consulted to find the network switch port associated with that network address, according to an embodiment. In the illustrated example, if the computing device connects to its switch port by using MAC address 00:0a:95:9d:68:02C, then LUT 303 can be accessed to determine that the device is connected to the second switch port. When the computing device was placed at its location, it would have been connected to the second switch port that corresponds to its location (and the network switch allows access to the computing device having MAC address 00:0a:95:9d:68:02 via the connected port). Once the switch port is known, the computing device may then execute the initialization protocol stored in memory to configure it for use at the location associated with that switch port.

Methodology

Figure 4:
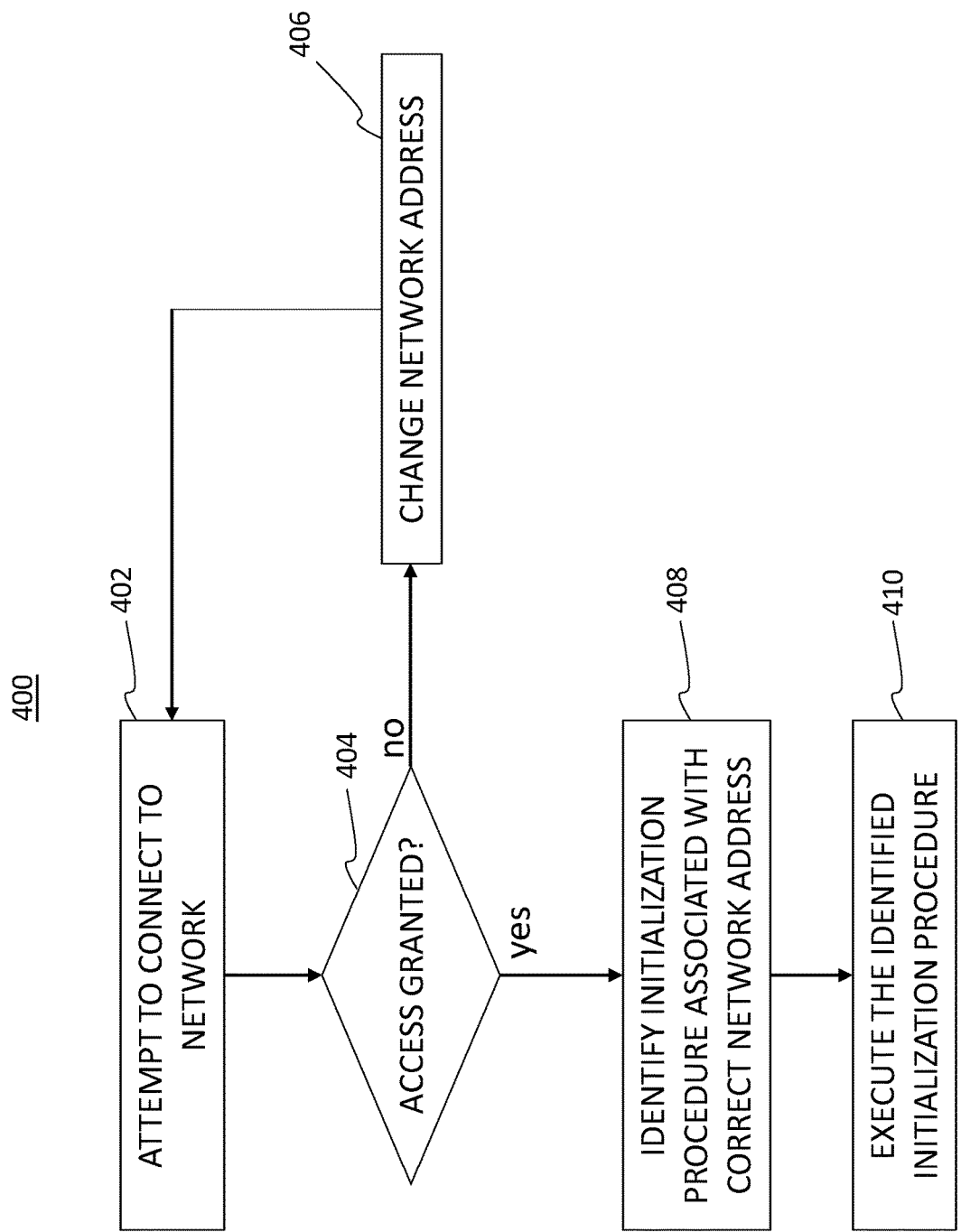
FIG. 4 is a flowchart of a method for initializing a computing device based on its physical location, in accordance with an embodiment of the present disclosure.

FIG. 4 illustrates an example method 400 for initializing a computing device based on its physical location, in accordance with certain embodiments of the present disclosure. As can be seen, the example method includes a number of phases and sub-processes, the sequence of which may vary from one embodiment to another. However, when considered in the aggregate, these phases and sub-processes form a process for a computing device to automatically determine its own location based on a network address used to connect to a switch, as described above, for example, with reference to FIGS. 1-3. The method may be implemented on the system architecture described with reference to FIG. 1, however other system architectures can be used in other embodiments, as will be apparent in light of this disclosure. To this end, the correlation of the various functions shown in FIG. 4 to the specific components illustrated in the other figures is not intended to imply any structural and/or use limitations. Numerous variations and alternative configurations will be apparent in light of this disclosure.

Method 400 begins with operation 402 where a computing device attempts to connect to a networked switch, according to an embodiment. The computing device may use a MAC address from a stored list of MAC addresses to attempt to connect to the network. Each of the stored list of MAC addresses may be associated with a particular location or initialization protocol for the computing device. Attempting to connect to the network via a particular network address may involve requesting some data transfer from the switch itself or from the WAN or LAN connected to the switch.

Method 400 continues with operation 404 where a determination is made whether or not access to the network was granted with the network address used during operation 402. If access was not granted, then the computing device is not located at whatever location is associated with the network address that failed, and method 400 proceeds to operation 406 where the network address is changed (e.g., to a different MAC address from the stored list of MAC addresses) and operations 402 and 404 are repeated using the new network address.

If access was granted in operation 404, then the computing device is able to use the network address that granted access to the network to determine its physical location. Method 400 continues with operation 408 where the correct initialization protocol for the computing device is identified based on which initialization protocol is associated with the network address that granted access to the network. In some embodiments, a LUT is accessed to determine which initialization protocol is associated with the network address that granted access to the network. In some embodiments, the LUT associates network addresses with known locations. The initialization protocol may include instructions for how to configure certain drivers of the computing device and/or instructions for certain operations to be performed by the computing device.

Method 400 continues with operation 410 where the identified initialization protocol is executed to configure the computing device for operating a certain way based on its location. The initialization protocol may be executed during or before a boot process of the computing device. In some embodiments, the initialization protocol is performed immediately after the boot process (e.g., after at least the drivers for the network interface are loaded). In some embodiments, the identified initialization protocol is executed at any time set either manually by a user or automatically by the computing device.

Method 400 may be performed upon start up of the computing device. In some embodiments, method 400 is performed when prompted by a user. For example, a user may disconnect a computing device from the switch and move the computing device to another location at which time the computing device is connected to a different port of the switch associated with its new location. In this example, the user may prompt the computing device to self-identify its location and configure itself for its new location by performing the operations of method 400.

In some embodiments, the computing device may periodically perform a check of whether its network address is still valid. The periodic check may be performed continually every 5 seconds, every 10 seconds, every minute, or every 5 minutes, to name some examples. If the network address is still found to be valid, then no action is taken. However, if the network address is no longer valid, then computing device would perform method 400 to find a new valid network address and configure itself for the correct location.

Figure 5:
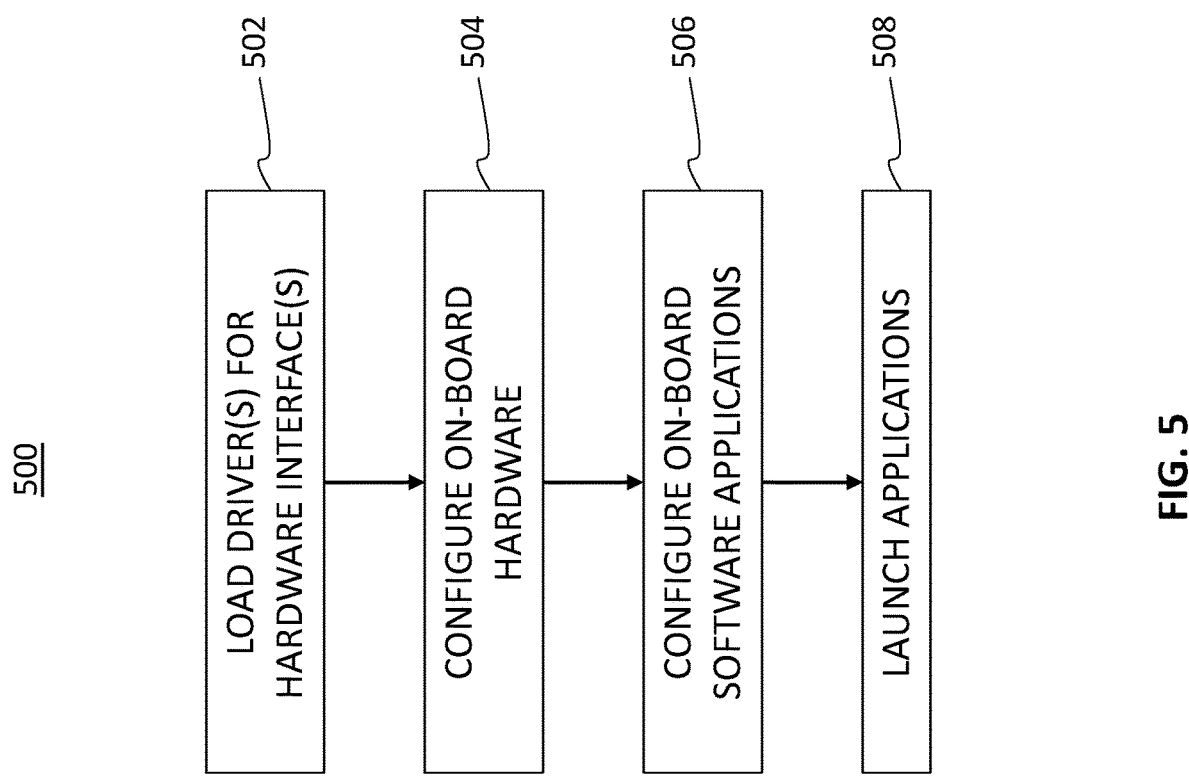
FIG. 5 is a flowchart of a method of executing an example initialization protocol on a computing device, in accordance with an embodiment of the present disclosure.

FIG. 5 illustrates an example method 500 for executing an example initialization protocol, such as the execution performed in operation 410 of method 400, in accordance with certain embodiments of the present disclosure. As can be seen, the example method includes a number of phases and sub-processes, the sequence of which may vary from one embodiment to another. However, when considered in the aggregate, these phases and sub-processes form a process for a computing device to execute an initialization protocol that configures it for use in a particular location. The correlation of the various functions shown in FIG. 5 to the specific components illustrated in the other figures is not intended to imply any structural and/or use limitations. Numerous variations and alternative configurations will be apparent in light of this disclosure.

Method 500 begins with operation 502 where corresponding drivers are loaded from memory to configure certain hardware on the computing device, according to an embodiment. Depending on the computing device location, some drivers may be needed while others are not to interface with different hardware elements.

Method 500 continues with operation 504 where on-board hardware is configured depending on the computing device's location, according to an embodiment. This configuration may involve setting up an internet protocol (IP) address for the computing device and/or particular hardware peripherals coupled to the computing device. Other hardware settings may be set based on what the hardware is expected to do for the given location of the computing device.

Method 500 continues with operation 506 where on-board software applications are configured depending on the computing device's location, according to an embodiment. This configuration may involve setting up IP addresses for different software applications on the computing device. Certain software applications may be loaded into either volatile or non-volatile memory on the computing device. In some embodiments, a same software application may be used at different locations but with different settings based on the location.

Method 500 continues with operation 508 where one or more of the loaded applications are launched, according to an embodiment. The launched application may be an operating system for the computing device. In some embodiments, the operating system has been configured differently based on the location of the computing device. Other launched applications may include some that are particularly suited for use in the location of the computing device.

Example Computing Platform

Figure 6:
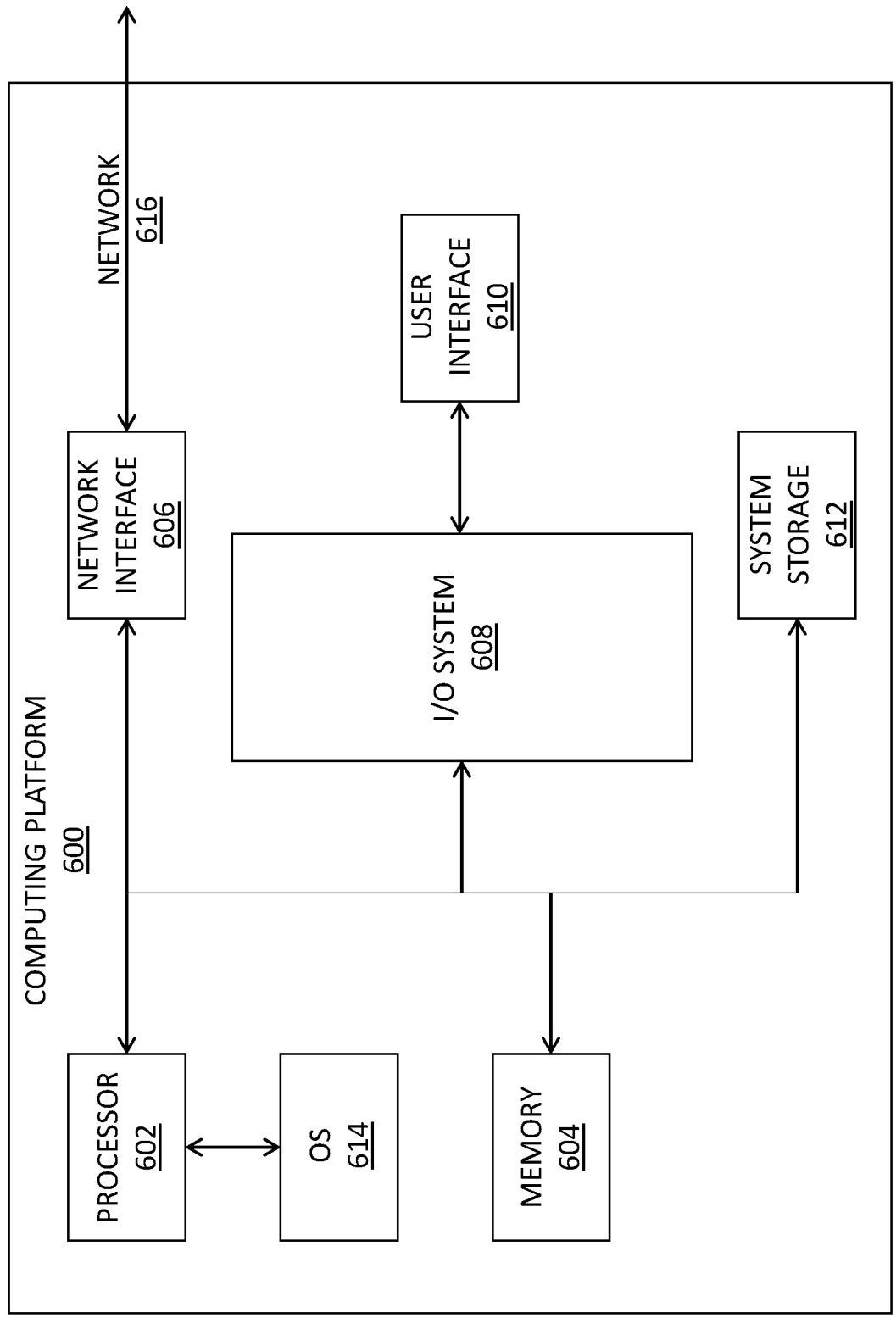
FIG. 6 illustrates a block diagram of an example computing platform for use in a network environment, in accordance with an embodiment of the present disclosure.

FIG. 6 illustrates an example computing platform 600, configured in accordance with certain embodiments of the present disclosure. Computing platform 600 may represent any of computing devices 102-1-102-n, in which case many of the components of computing platform 600 are similar to those already described for computing device 102. In some embodiments, computing platform 600 represents a system that includes the functionality of a network switch, such as a managed Ethernet switch. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, computing platform 600 may comprise any combination of a processor 602, a memory 604, a network interface 606, an input/output (I/O) system 608, a user interface 610, and a storage system 612. As can be further seen, a bus and/or interconnect is also provided to allow for communication between the various components listed above and/or other components not shown. Computing platform 600 can be coupled to a network 616 through network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 602 can be any suitable processor and may include one or more coprocessors or controllers to assist in control and processing operations associated with computing platform 600. In some embodiments, processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 604 can be implemented using any suitable type of digital storage including, for example, flash memory and/or random access memory (RAM). In some embodiments, memory 604 may include various layers of memory hierarchy and/or memory caches as are known to those of skill in the art. Memory 604 may be implemented as a volatile memory device such as, but not limited to, a RAM, dynamic RAM (DRAM), or static RAM (SRAM) device. Storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 612 may comprise technology to increase the storage performance enhanced protection for valuable digital media when multiple hard drives are included.

Processor 602 may be configured to execute an Operating System (OS) 614 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing platform 600, and therefore may also be implemented using any suitable existing or subsequently-developed platform.

Network interface 606 can be any appropriate network chip or chipset which allows for wired and/or wireless connection between other components of computing platform 600 and/or network 616, thereby enabling computing platform 600 to communicate with other local and/or remote computing devices, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 608 may be configured to interface between various I/O devices and other components of computing platform 600. I/O devices may include, but not be limited to, a user interface 610. User interface 610 may include devices (not shown) such as a display element, touchpad, keyboard, mouse, and speaker, etc. I/O system 608 may include a graphics subsystem configured to perform processing of images for rendering on a display element. Graphics subsystem may be a graphics processing unit (GPU) or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wired and/or wireless high definition compliant techniques. In some embodiments, the graphics subsystem could be integrated into processor 602 or any chipset of computing platform 600.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, computing platform 600 may be implemented as a a wired system or a combination of a wired system and a wireless system. Computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. Computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing device, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, Blu-ray media, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating,"

"determining," or the like refer to the action and/or process of a computer or computing device, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Further Example Embodiments

The following examples pertain to further embodiments, from which numerous permutations and configurations will be apparent.

Example 1 is a computing device that includes a network interface, a memory, and a processor. The network interface communicates with a physical port of a network switch. The memory stores a plurality of different initialization protocols each associated with a corresponding network address of a stored plurality of network addresses. The processor is designed to attempt to connect to the network switch via the network interface using a network address from the stored plurality of network addresses and, in response to connecting with the network switch using the network address, identify a corresponding initialization protocol associated with the network address. The processor also executes the corresponding initialization protocol.

Example 2 includes the subject matter of Example 1, wherein the plurality of network addresses comprise MAC addresses.

Example 3 includes the subject matter of Example 1 or 2, wherein each of the different initialization protocols includes a different boot process for the computing device.

Example 4 includes the subject matter of any one of Examples 1-3, wherein the network interface uses a wired Ethernet connection to communicate with the physical port of the network switch.

Example 5 includes the subject matter of any one of Examples 1-4, wherein the processor is further configured to continue to attempt to connect to the network switch using a different network address from the stored plurality of network addresses until connection is made to the network switch with the different network address.

Example 6 includes the subject matter of Example 5, wherein connection is made to the network switch when data transfer between the computing device and the network switch occurs via the network interface.

Example 7 includes the subject matter of any one of Examples 1-6, wherein each of the different initialization protocols is associated with a different physical location of the computing device.

Example 8 includes the subject matter of Example 7, wherein the memory is configured to store a look-up table that matches each of the physical locations with its corresponding network address.

Example 9 includes the subject matter of any one of Examples 1-8, wherein the plurality of network addresses is stored in the memory of the computing device before connection is made between the network interface and the switch.

Example 10 includes the subject matter of any one of Examples 1-9, wherein the processor is further configured to identify the physical location of the computing device based on the network address used to connect with the switch.

Example 11 is an Ethernet network that includes an Ethernet switch and a plurality of computing devices. The Ethernet switch includes a plurality of physical ports and is configured such that each port of the plurality of physical ports is associated with a single network address. Each of the plurality of computing devices includes a network interface, a memory, and a processor. The network interface communicates with one port of the plurality of physical ports. The memory stores a plurality of different initialization protocols each associated with a corresponding network address of a stored plurality of network addresses. The processor is designed to attempt to connect to the Ethernet switch via the network interface using a network address from the stored plurality of network addresses and, in response to connecting with the Ethernet switch using the network address, identify a corresponding initialization protocol associated with the network address. The processor also executes the corresponding initialization protocol.

Example 12 includes the subject matter of Example 11, wherein the plurality of network addresses comprise MAC addresses.

Example 13 includes the subject matter of Example 11 or 12, wherein each of the different initialization protocols includes a different boot process for the computing device.

Example 14 includes the subject matter of any one of Examples 11-13, wherein the network interface uses a wired Ethernet connection to communicate with the one port of the plurality of physical ports.

Example 15 includes the subject matter of any one of Examples 11-14, wherein the processor is further configured to continue to attempt to connect to the Ethernet switch using a different network address from the stored plurality of network addresses until connection is made to the Ethernet switch with the different network address.

Example 16 includes the subject matter of Example 15, wherein connection is made to the Ethernet switch when data transfer between the computing device and the Ethernet switch occurs via the network interface.

Example 17 includes the subject matter of any one of Examples 11-15, wherein each of the computing devices is at a different physical location and each of the different initialization protocols of a corresponding computing device is associated with a location of the corresponding computing device.

Example 18 includes the subject matter of Example 17, wherein the memory is configured to store a look-up table that matches each of the different physical locations with its corresponding network address.

Example 19 includes the subject matter of Example 17 or 18, wherein each of the computing devices is at a different physical location on a vehicle.

Example 20 includes the subject matter of any one of Examples 11-19, wherein each of the plurality of computing devices has the same hardware configuration.

Example 21 includes the subject matter of any one of Examples 11-20, wherein the plurality of network addresses is stored in the memory of the computing device before connection is made between the network interface and the Ethernet switch.

Example 22 includes the subject matter of any one of Examples 11-21, wherein the processor is further configured to identify the physical location of the computing device based on the network address used to connect with the Ethernet switch.

Example 23 is a computer program product including one or more non-transitory machine-readable mediums encoding instructions that when executed by one or more processors cause a process to be carried out for initializing a computing device based on its physical location. The process includes attempting to connect to a network switch via a network interface of the computing device using a network address from a stored plurality of network addresses, wherein each of the stored plurality of network addresses is associated with a different initialization protocol; in response to connecting with the network switch using the network address, identifying a corresponding initialization protocol associated with the network address; and executing the corresponding initialization protocol to configure the computing device.

Example 24 includes the subject matter of Example 23, wherein the plurality of network addresses comprises MAC addresses.

Example 25 includes the subject matter of Example 23 or 24, wherein each of the different initialization protocols includes a different boot process for the computing device.

Example 26 includes the subject matter of any one of Examples 23-25, wherein the process further comprises continuing to attempt to connect to the network switch using a different network address from the stored plurality of network addresses until connection is made to the network switch with the different network address.

Example 27 includes the subject matter of Example 26, wherein connection is made to the network switch when data transfer between the computing device and the network switch occurs via the network interface.

Example 28 includes the subject matter of any one of Examples 23-27, wherein each of the different initialization protocols is associated with a different location of the computing device.

Example 29 includes the subject matter of any one of Examples 23-28, wherein the plurality of network addresses is stored in a memory of the computing device before connection is made between the network interface and the switch.

Example 30 includes the subject matter of any one of Examples 23-29, wherein the process further comprises identifying the physical location of the computing device based on the network address used to connect with the network switch.

What is claimed is:

1. A computing device, comprising:
   a network interface configured to communicate with a physical port of a network switch;
   a memory configured to store a plurality of different initialization protocols each associated with a corresponding network address of a stored plurality of network addresses; and
   a processor configured to attempt to
     connect to the network switch via the network interface using a network address from the stored plurality of network addresses;
     in response to connecting with the network switch using the network address, identify a corresponding initialization protocol associated with the network address; and
     execute the corresponding initialization protocol.

2. The computing device of claim 1, wherein the plurality of network addresses comprise MAC addresses.

3. The computing device of claim 1, wherein each of the different initialization protocols includes a different boot process for the computing device.

4. The computing device of claim 1, wherein the network interface uses a wired Ethernet connection to communicate with the physical port of the network switch.

5. The computing device of claim 1, wherein the processor is further configured to continue to attempt to connect to the network switch using a different network address from the stored plurality of network addresses until connection is made to the network switch with the different network address.

6. The computing device of claim 5, wherein the plurality of network addresses is stored in the memory of the computing device before connection is made between the network interface and the network switch.

7. The computing device of claim 1, wherein each of the different initialization protocols is associated with a different physical location of the computing device.

8. The computing device of claim 6, wherein the memory is configured to store a look-up table that matches each of the physical locations with its corresponding network address.

9. The computing device of claim 1, wherein the processor is further configured to identify the physical location of the computing device based on the network address used to connect with the network switch.

10. An Ethernet network, comprising:
    an Ethernet switch comprising a plurality of physical ports, wherein the Ethernet switch is configured such that each port of the plurality of physical ports is associated with a single network address; and
    a plurality of computing devices, each computing device of the plurality of computing devices comprising a network interface configured to communicate with one port of the plurality of physical ports;

a memory configured to store a plurality of different initialization protocols each associated with a corresponding network address of a stored plurality of network addresses; and a processor configured to
- attempt to connect to the Ethernet switch via the network interface using a network address from the stored plurality of network addresses;
- in response to connecting with the Ethernet switch using the network address, identify a corresponding initialization protocol associated with the network address; and
- execute the corresponding initialization protocol.

11. The Ethernet network of claim 10, wherein the plurality of network addresses comprise MAC addresses.

12. The Ethernet network of claim 10, wherein each of the different initialization protocols includes a different boot process for the computing device.

13. The Ethernet network of claim 10, wherein the network interface uses a wired Ethernet connection to communicate with the one port of the plurality of physical ports.

14. The Ethernet network of claim 10, wherein the processor is further configured to continue to attempt to connect to the Ethernet switch using a different network address from the stored plurality of network addresses until connection is made to the Ethernet switch with the different network address.

15. The Ethernet network of claim 10, wherein each of the computing devices is at a different physical location and each of the different initialization protocols of a corresponding computing device is associated with a location of the corresponding computing device.

16. The Ethernet network of claim 15, wherein the memory is configured to store a look-up table that matches each of the different physical locations with its corresponding network address.

17. The Ethernet network of claim 10, wherein each of the plurality of computing devices has the same hardware configuration.

18. A computer program product including one or more non-transitory machine-readable mediums encoding instructions that when executed by one or more processors cause a process to be carried out for initializing a computing device based on its physical location, the process comprising:
- attempting to connect to a network switch via a network interface of the computing device using a network address from a stored plurality of network addresses, wherein each of the stored plurality of network addresses is associated with a different initialization protocol;
- in response to connecting with the network switch using the network address, identifying a corresponding initialization protocol associated with the network address; and
- executing the corresponding initialization protocol to configure the computing device.

19. The computer program product of claim 18, wherein the process further comprises continuing to attempt to connect to the network switch using a different network address from the stored plurality of network addresses until connection is made to the network switch with the different network address.

20. The computer program product of claim 18, wherein the process further comprises identifying the physical location of the computing device based on the network address used to connect with the network switch.

* * * * *